United States Patent [19]

Nauman

[11] Patent Number: 4,594,371

[45] Date of Patent: Jun. 10, 1986

[54] FINE PARTICLE DISPERSIONS OF INCOMPATIBLE POLYMERS IN POLYMER MATRICES

[75] Inventor: E. Bruce Nauman, Schenectady, N.Y.

[73] Assignee: Rensselaer Polytechnic Institute, Troy, N.Y.

[21] Appl. No.: 729,529

[22] Filed: May 2, 1985

Related U.S. Application Data

[63] Continuation-in-part of Ser. No. 646,311, Aug. 31, 1984, abandoned.

[51] Int. Cl.⁴ .............................................. C08G 77/34
[52] U.S. Cl. ..................................... 523/340; 521/62; 524/481; 525/133; 525/152
[58] Field of Search ................ 523/340; 525/133, 152; 521/62; 524/481

[56] References Cited

U.S. PATENT DOCUMENTS

| | | | |
|---|---|---|---|
| 3,345,321 | 10/1967 | Geurtsen et al. | 523/340 |
| 4,203,877 | 5/1980 | Baker | 524/500 |
| 4,311,633 | 1/1982 | Lee, Jr. | 525/133 |

FOREIGN PATENT DOCUMENTS 58-53947  3/1983  Japan ................................. 525/133

Primary Examiner—Joseph L. Schofer
Assistant Examiner—N. Sarofim
Attorney, Agent, or Firm—McGlew and Tuttle

[57] ABSTRACT

A method of making and composition for a fine particle dispersion of incompatible polymers in a polymer matrix comprises forming a solution of the incompatible polymers in a solvent which is common to both polymers and rapidly evaporating the solvent. The remaining material is in the form of the polymer matrix.

8 Claims, 3 Drawing Figures

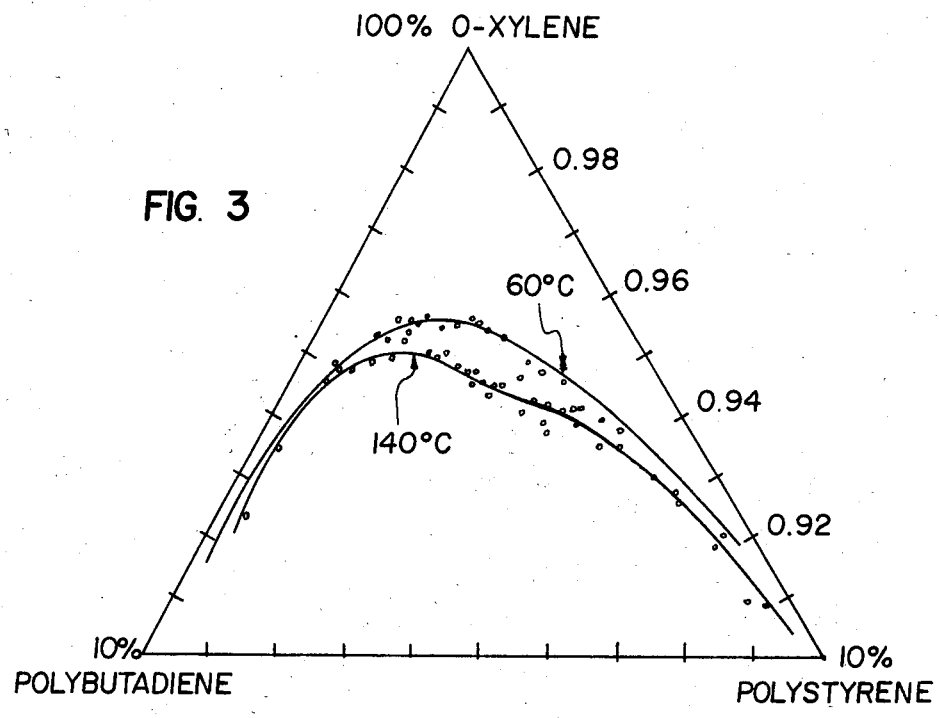

FINE PARTICLE DISPERSIONS OF INCOMPATIBLE POLYMERS IN POLYMER MATRICES

CROSS REFERENCE TO RELATED APPLICATIONS

This is a continuation-in-part application of the inventor's previous application having Ser. No. 646,311 filed Aug. 31, 1984, now abandoned.

FIELD AND BACKGROUND OF THE INVENTION

The present invention relates in general to polymer matrices, and in particular to a new and useful method of dispersing fine particles of different incompatible polymers into one polymer matrix.

ABS is an important thermoplastic having U.S. markets of several billion pounds per year with selling prices of $0.50 to $1.00 per pound. It is a two-phase polymer. The continuous or matrix phase is a copolymer of styrene and acrylonitrile typically formed by a free-radial polymerization and typically containing 25 to 35% acrylonitrile. By itself, this matrix phase would be hard and glossy when injection molded but would lack impact strength. Major improvements in practical toughness are possible when a polybutadiene rubber is incorporated into the plastic as a dispersed phase.

Several processes exist for incorporation of rubber into a continuous polymer matrix. Physical blends of rubber and the polymer are possible using intensive shear devices such as extruders, but these give a product of poor quality. A superior product is formed by the so-called emulsion process where fine particles of rubber are created by emulsification and hwere the matrix phase is formed by copolymerization of styrene and acrylonitrile in the presence of these particles. This process gives an impact-resistant product having good molded gloss. The average rubber particle size is typically less than one micron.

The emulsion process is relatively expensive, and substantial efforts have been devoted to replacing it with a cheaper, bulk process, analogous to bulk processes commonly used for the manufacture of impact polystyrene. In these bulk processes, a polybutadiene rubber is dissolved in the monomers which will ultimately be polymerized to form the matrix phase, these being styrene and acrylonitrile in the case of ABS.

The polymerization is initiated by heat or chemical means and takes place in an agitated vessel. The vessel can be operated as a batch reactor but continuous flow is more common in modern processes. As the polymer is made, it forms a separate phase from that of the rubber. The system consists of two liquid phases, one being rubber dissolved in the monomeric mixture and the other being newly formed copolymer dissolved in the monomeric mixture. A phase diagram for the system is illustrated in FIG. 1.

The feed to an agitated vessel consists of rubber and monomers and is in the single phase region at 10. The effluent stream from the agitated vessel contains rubber, monomers, and (co) polymers at 11 and is in the two phase region 12. Typically, the agitated vessel will be operated such that the polymer-rich phase has a substantially greater volume than the rubber-rich phase and will thus be the continuous phase. The rubber-rich phase will be distributed into more or less spherical droplets the size of which depends on operating conditions within the agitated vessel and notably on the speed of the agitator. In practice, rubber particle sizes of 2 to 5 microns are achieved by this process. Particles of 1 micron or smaller are difficult or impossible to achieve even with very high levels of agitation.

Rubber particle sizes in the range of 2 to 5 microns are suitable for most grades of impact polystyrene but are unsuitable for ABS for which good molded gloss is a product requirement. This fact has lead to the abondonment of bulk processes for molding grades of ABS or to the creation of hybrid processes in which small rubber particles are achieved through emulsification.

SUMMARY OF THE INVENTION

The present invention provides a new means of forming rubber particles in a polymer matrix. The new technique allows control over rubber particle size which is independent of the polymerization process and which is not critically dependent on hydrodynamic shear forces, induced through agitation.

Accordingly, an object of the present invention is to provide a method of dispersing one polymer in a matrix of another. This is accomplished by creating a single phase mixture of the two polymers using a common solvent of the two polymers and then rapidly evaporating the solvent to leave the desired dispersion.

A further object of the present invention is to provide a composition formed of two different incompatible polymers in a single polymer matrix which are finely divided into each other. The various features of novelty which characterize the invention are pointed out with particularity inthe claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

FIG. 3 is a detailed diagram similar to FIG. 2 showing an embodiment of the invention.

DESCRIPTION OF THE PREFERRED EMBODIMENT

Figure 1:
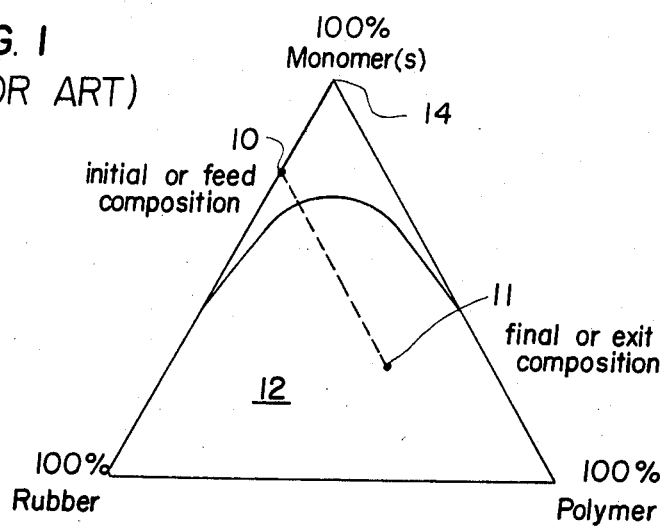
FIG. 1 is a phase diagram of the prior art showing how two polymers typically a rubber and another polymer, and one or more monomers form two phases over most compositions, at region 12, during the course of the polymerization, the reaction mass gradually evolving from 10 to 11 by the relatively slow process of polymerization.
Figure 2:
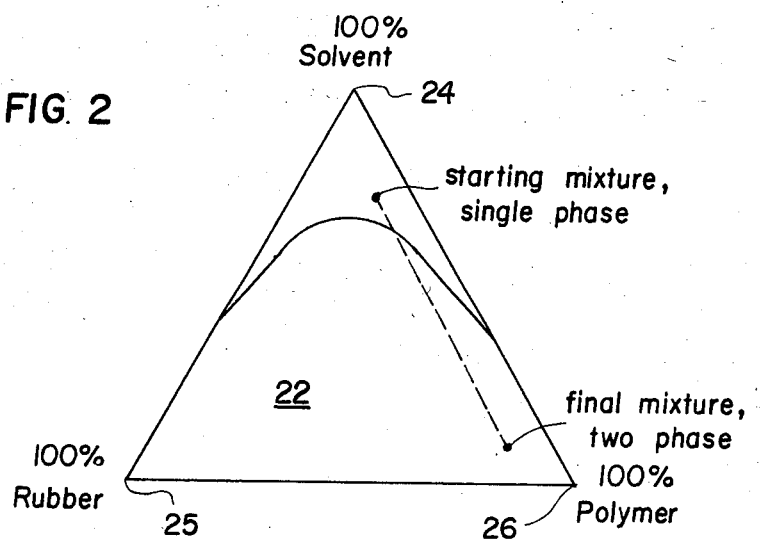
FIG. 2 is a diagram similar to FIG. 1 showing the principle of the invention wherein a solvent is used.

Referring to the phase diagram of FIG. 2, this diagram is similar to FIG. 1 in that two polymeric components are present, rubber at 25 and the polymer at 26 which will form the matrix phase of the finished product in area 22. The third component at 24 is a common solvent for the polymeric components. It can be the monomer(s) of FIG. 1 at 14 or it can be a non-polymeric solvent such as toluene. The polymer may be a copolymer of styrene and acrylonitrile and the rubber may be polybutadiene rubber.

According to the invention, a single phase, three component mixture as illustrated in the phase diagram of FIG. 2 is taken as the starting point, and then the solvent undergoes rapid evaporation to drive the mixture into the two phase region 22. This evaporation can occur in the complete absence of polymerization or mechanically induced hydrodynamic forces although such phenomena may occur incidentally without altering the essential nature of the process. Advantageously, the solvent evaporation will proceed to an extent that the resulting polymeric mixture will have such a high viscosity that growth of rubber particles through agglomeration is minimized. Further stabilization of the rubber particles will occur when the unevaporated solvent is a monomer which crosslinks or grafts onto the dispersed particles.

The size of the rubber particles is controlled by two main factors: the ratio of rubber to matrix polymer in the initial mixture and the rate of evaporation. Low rubber concentrations and high evaporation rates favor small rubber particle sizes. Surface active agents such as styrene-butadiene block copolymers and can also be employed to affect the rubber particle size.

Laboratory demonstrations of rubber particle formation by means of this invention can be made using heated microscopic slides. The starting mixture is placed on a slide and the solvent is rapidly evaporated. For industrial applications, the starting mixture can be heated under pressure and then rapidly evaporated by exposure to a zone of reduced pressure.

To achieve rubber particles dispersed in a polymeric matrix, the volume of the rubber phase after evaporation must consist of less than half the total volume. Typically, it must be less than twenty-five percent (25%) of the total volume. The weight fraction of rubber in the final product can be no more than the weight fraction of rubber in the starting mixture expressed on a solvent-free basis. The weight fraction of rubber can be made less than this by admixing matrix polymer or by polymerizing any unevaporated monomers.

The matrix polymer may also be polystyrene by itself, in combination with the rubber which may be polybutadiene. The rubber might also be saturated rubber of the EPDM type which can be used in combination with polystyrene or polystyrene/acrylonitrile. The matrix polymer might also be polyphenyleneoxide or a blend of polyphenylenoxide and polystyrene. The solvent might be polymerizable monomer or monomer mixture.

Surface-active agents for improving the dispersion quality might also be added into the original mixture. These agents might be AB, ABA, or BAB block copolymers where the A-block is compatible with the matrix phase and B-block is compatible with the dispersed phase.

A composition of the invention can be formed as a matrix phase composed of a styrene-acrylonitrile copolymer and a dispersed phase comprised of a lightly crosslinked rubber in the absence of any substantial concentrations of surfactants other than the block copolymers mentioned above. In the method of the invention, different evaporation rates can also be used for different portions of the original mixture in order to create bimodal or controlled particle size distribution for the dispersed phase.

A specific example of the invention follows:

EXAMPLE

A mixture consisting of
97% ortho-xylene (a solvent)
2.7% polystyrene
0.3% polybutadiene was formed at room temperature and was allowed to equilibrate for several days. The resulting mixutre was singe phase.

After equilibration, this mixture was heated to about 245° C. by flowing it through a heat exchanger. A valve at the end of the heat exchanger maintained backpressure and prevented premature evaporation of the solvent. After the valve, the mixture entered a flash chamber maintained at about 100 Torr pressure. The heated mixture flash evaporated to give a two phase mixture with the following approximate composition:
50% ortho-xylene
45% polystyrene
5% polybutadiene.

The temperature after flash evaporation was approximately 165° C. The two-phase mixture was gradually cooled to room temperature. The polybutadiene was observed to form a dispersed phase having a number average particle size less than 1 micron.

The following requirements must be satisfied to form a polymer-in-polymer microdispersion devolatilization of a compatibilizing solvent:

1. The pure polymers must be incompatible so that a physical mixture of them would form two phases. Polymer/polymer compatibility has been studied at length. Most pairs are incompatible. The inventive method will not work for a compatible pair. However, it can work for a three polymer system where a compatible alloy of two polymers is incompatible with a third polymer. Two important examples of alloys are polyphenelene oxide with polystyrene and polysulfone with poly(styrene-acrylonitrile) copolymer. A third polymer can be dispersed into such an alloy if all other requirements are satisfied.

2. A compatibilizing solvent or solvent mixture must be found which introduces a single phase region into the ternary system of polymer A/polymer B/solvent. Practical considerations suggest that about 1% total polymer soluability is required. This lower limit, however, is not firm. It is dictated by solvent recovery costs and could be violated if the resulting product is especially valuable. It is not possible to find a suitable solvent for all pairs of incompatible polymers but it is possible for a great many pairs. Solvent selection for screening purposes is a straight-forward application of known principles.

3. The compatibilizing solvent must be sufficiently volatile so that it can be evaporated at temperatures which are not destructive to the polymers. The ideal solvent would have a low boiling point and a low heat of vaporization.

4. The volume fraction of the dispersed phase polymer must not be higher than about 0.2. At higher volume fractions (0.2 to 0.5), large particles are formed and there is a tendency for both phases to be continuous.

5. The molecular weight of the continuous phase polymer must be reasonably high so that particle growth by diffusion or agglorimation is insignificant after the flash evaporation step. In essence, the dispersion is stabilized by the high viscosity of the continuous phase.

These restrictions are quite mild. They can be satisfied by many pairs of commercial polymers and by a host of specialty polymers. If both polymers are readily soluable in common organic solvents, it is quite likely that the method can be made to work. It will obviously not work for insoluable polymers and may or may not work when one polymer is difficultly soluable.

These statements and the likely ease or difficulty of getting the method to work will be obvious to those knowledgeable in polymer physical chemistry.

The following example systems illustrate the above points:

| Systems | Continuous Phase | Dispersed Phase | Solvent |
|---|---|---|---|
| 1 | Polystyrene | Polybutadiene | O—xylene |
| 2 | Polystyrene | Polybutadiene | Styrene |
| 3 | Polystyrene | Polybutadiene | Toluene |
| 4 | Polystyrene | Polybutadiene | Tetrahydrofuran |
| 5 | Polybutadiene | Polystyrene | O—xylene |
| 6 | Polybutadiene | EPDM Rubber | Tetrahydrofuran |
| 7 | EPDM Rubber | Polybutadiene | Tetrahydrofuran |
| 8 | Styrene-Acrylonitrile Copolymer | EPDM Rubber | 1,2 Dichlolobenzene |
| 9 | High MW Alkylated Phenolic Resin | Polybutadiene | Tetrahydrofuran |
| 10 | High MW Coating Resin | Polybutadiene | Tetrahydrofuran |

In all these systems, we have obtained dispersed phase particle sizes of 10μ or less when the above criteria have been met. Systems 1-4 shows that a variety of solvents can be used when they all satisfy the criteria. System 5 shows that the choice of which polymer is continuous and which is dispersed can be changed at will. Systems 6 and 7 illustrate the dispersion of a pair of rubbers in each other. These polymers have glass transition temperatures well below room temperature and show that the dispersion is stable even though the continuous phase is technically a liquid. System 8 illustrates a case where finding a compatibilizing solvent was more difficult in the sense that none of the previous solvent examples would work. However, identification of 1,2 dicholobenzene was a straightforward application of known principles. Systems 9 and 10 represents the interesting situation where the method did not work when the continuous phase polymer had too low a viscosity. As received, both of the resins were low molecular weight oligimers rather than high polymers. However, they were both heat reactive so that the viscosity could be increased through additional polymerization. Following this polymerization, the method worked.

The above list of systems is by no means inclusive. The following additional polymers also work with the inventive method: LDPE, PMMA, polysulfone, polycarbonate and polyphenylene oxide. Whether or not the method works for a given pair of polymers depends on finding a suitable solvent. It does not depend on any special characteristics of the polymer beyond having a high molecular weight and being soluable.

FIG. 3 shows the case where polybutadiene is to be combined in a matrix with polystyrene using O-xylene as a solvent. Curves for evaporation at 60° C. and at 140° C. are shown.

In the following table, nine additional combinations are shown which have been found to operate in accordance with the present invention. With all of these combinations, microdispersions have been achieved.

These include three additional polymers, namely polycarbonate, polysulfone, and poly(methyl methacrylate). This further evidences the large number of examples which can work under the principles of the present invention.

| | ADDITIONAL MICRODISPERSION EXAMPLES | |
|---|---|---|
| MATRIX POLYMER | DISPERSED POLYMER | SOLVENT |
| Polystyrene | Polycarbonate | Chloroform |
| Poly(methylacrylate) | Polystyrene | Tetrahydrofuran |
| Polystyrene | Poly(methl methacrylate) | Tetrahydrofuran |
| MATRIX POWER | | |
| Poly(methyl methacrylate) | Polybutadiene | Tetrahydrofuran |
| Polystyrene | Phenolic | O—xylene |
| Phenolic | Polystyrene | O—xylene |
| Polybutadiene | Phenolic | O—xylene |
| Polysulfone | Phenolic | 1,2 Dichlorobenzene |
| Phenolic | Polysulfone | 1,2 Dichlorobenzene |

While a specific embodiment of the invention has been shown and described in detail to illustrate the application of the principles of the invention, it will be understood that the invention, may be embodied otherwise without departing from such principles.

What is claimed is:

1. A method of manufacturing a two phase dispersion of a first polymer in a matrix of a second polymer where the polymers are incompatible initially and have high molecular weights, comprising forming a single-phase mixture of the first and second polymers in a sufficient amount of a solvent which is common to the first and the second polymers and which does not constitute more than about 99% by weight of said single-phase mixture, the solvent being selected to be sufficiently volatile so that it can be evaporated at temperatures which are not destructive to the polymers and the solvent-free volume fraction of the first polymer being at most about 0.2, heating the single phase mixture under pressure, and thereafter introducing the mixture into a zone of reduced pressure for flash evaporating the solvent to form a two phase mixture and the matrix, the pressure being selected so that after the flash evaporating the two phase mixture contains about 50% solvent.

2. A method according to claim 1, wherein the first polymer is selected from the group consisting of polybutadiene, polystyrene, and EPDM rubber.

3. A method according to claim 1, wherein the second polymer is chosen from the group consisting of polystyrene, polybutadiene, EPDM rubber, styrene-acrylonitrile copolymer, high MW alkylated phenolic resin, and high MW coating resin.

4. A method according to claim 1, wherein the solvent is selected from the group consisting of O-xylene, styrene, toluene, tetrahydrofuran, and 1, 2 dicholobenzene.

5. A method according to claim 1, including adding a surface-active agent to the single-phase mixture.

6. A method according to claim 5, wherein the surface-active agent is chosen from the group consisting of AB, ABA, BAB block polymers where the A-block is compatible with the matrix and the B-block is compatible with the dispersed polymer.

7. A composition of matter having a finely dispersed first polymer in a mixture of a second polymer and made according to the method of claim 1, the composition comprising a dispersion of a first finely divided polymer in a matrix of a second polymer which is incompatible with said first polymer, particles of said first polymer being less than one micron in a diameter.

8. A composition according to claim 7, comprising a matrix phase of polystyrene-acrylonitrile copolymer and a dispersed phase of lightly crosslinked rubber in the absence of substantial concentrations of surfactant other than surface-active agents comprising AB, ABA or BAB block copolymers where A-block is compatible with the matrix phase and B-block is compatible with the dispersed phase.

* * * * *